Figure 1:
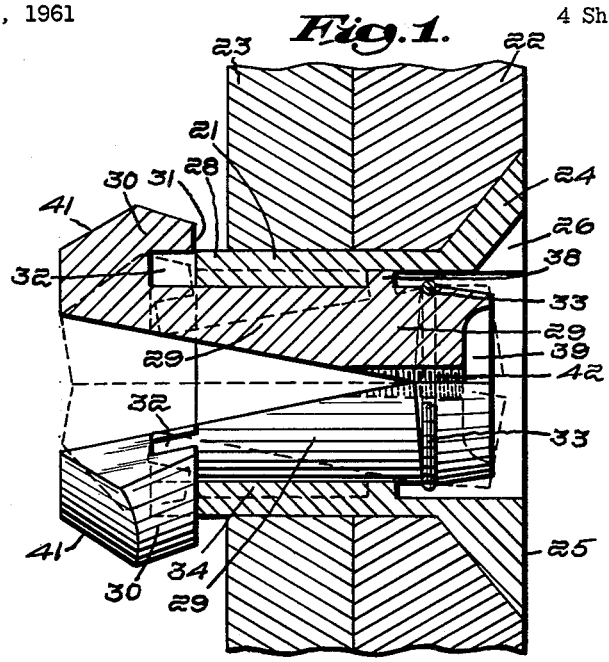

Dec. 8, 1964   J. H. DEVINE ETAL   3,160,053
RATCHET-LIKE FASTENER WITH MULTI-PART NUT AND CENTERING SLEEVE
Filed Aug. 4, 1961   4 Sheets-Sheet 1

Inventors:
James Henry Devine,
Evelyn Yurcessen Devine,
by Arthur D. Thomson
Attorney Dec. 8, 1964   J. H. DEVINE ETAL   3,160,053
RATCHET-LIKE FASTENER WITH MULTI-PART NUT AND CENTERING SLEEVE
Filed Aug. 4, 1961   4 Sheets-Sheet 2
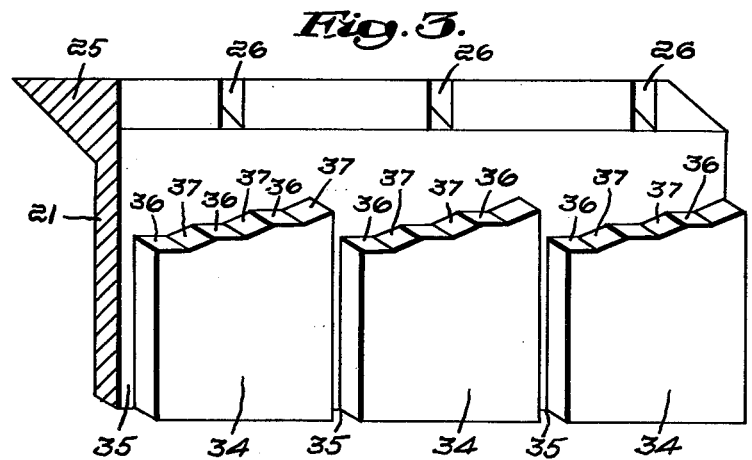
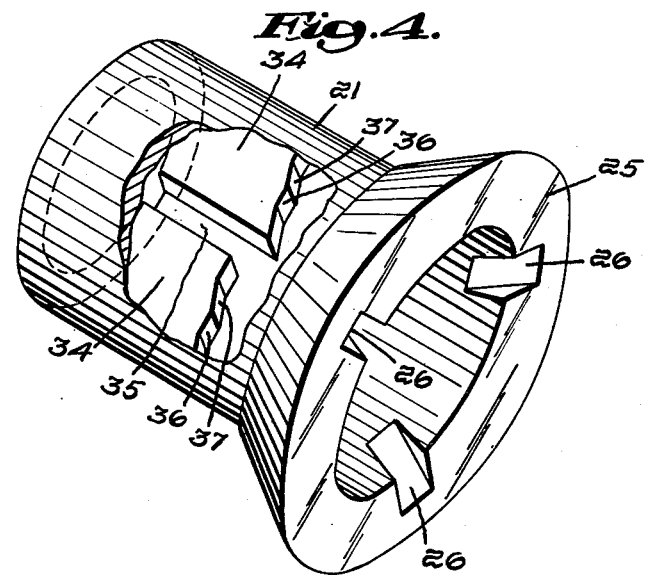
Inventors:
James Henry Devine,
Evelyn Yurcessen Devine,
by Arthur D. Thomson
Attorney Inventors:
James Henry Devine,
Evelyn Yurcessen Devine,
by Arthur D. Thomson
Attorney

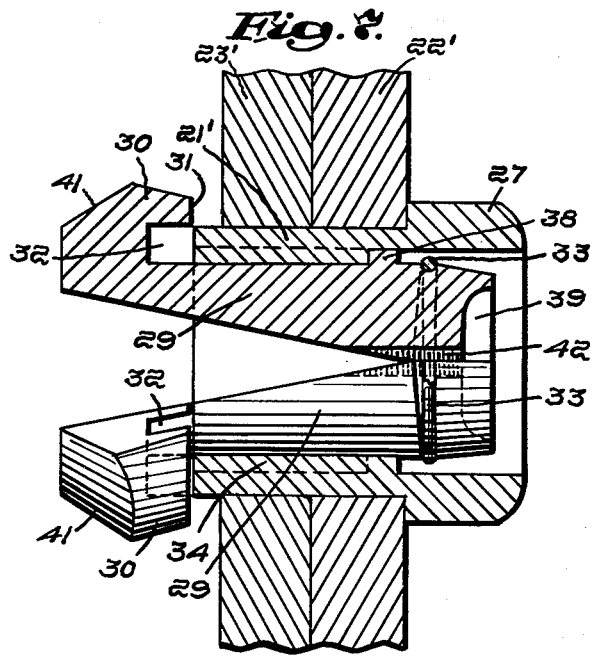
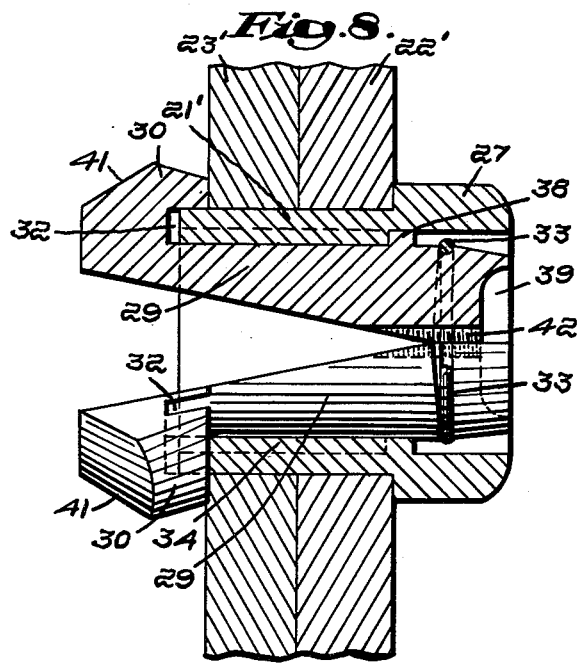

United States Patent Office 3,160,053
Patented Dec. 8, 1964

3,160,053
RATCHET-LIKE FASTENER WITH MULTI-PART NUT AND CENTERING SLEEVE
James Henry Devine, Brookline, Mass., and Evelyn Yurcessen Devine, 380 Washington St., Brookline, Mass.; said James Henry Devine assignor to D-Y Trust, Boston, Mass., a trust of Massachusetts
Filed Aug. 4, 1961, Ser. No. 129,403
1 Claim. (Cl. 85—1)

This invention relates to improvements in fasteners for clamping together two or more structural plates or panels, irrespective of the accessibility of the innermost plate or panel, and pertains more particularly to fasteners of the type comprising a multi-segment expandable nut assembly which is contained in a centering sleeve receivable in concentric openings in juxtaposed plates or panels, and which is tightened and releasibly secured by a ratchet-like action, in a series of successive steps.

In our copending application Serial No. 835,580, filed August 24, 1959, now Patent No. 3,096,678, we have disclosed a novel blind bolt employed for a similar purpose and comprising a similar expandable nut assembly and centering sleeve, in which the nut segments were machine-threaded on their interior surfaces to receive an externally threaded center component or bolt member which expanded the projecting head portions of the nut segments and tensioned them into locking position against the blind surface of the innermost of the panels, to clamp the panels together. Other types of blind bolts are shown in the prior patents referred to in that application and in our copending application Serial No. 27,857, filed May 9, 1960.

In each of our said applications, the bolts or fasteners were tightened and clamped by multiple rotations of the threaded member which engaged complemental threads on the expandable segments of the bolt, to expand the head portions of the segments and tension them in clamping position.

It is the principal purpose of the present invention to substantially reduce the degree of rotation of the clamping element of the improved fastener, and to avoid the necessity of precise interfit of precision made threads, by providing a fastener designed to achieve the same result with less time and effort through a novel step-ratchet torque action which effectively tensions and clamps a three segment nut component by rotating a clamping element no more than 120°. The fastener may be quickly and easily released by reversing the rotation of the clamping element.

In the embodiment of the present invention, the fastener comprises a three-segment, expandable nut component assembled in a centering sleeve; each nut segment having a projecting lug which, when the nut component is turned in the sleeve, rides over an inclined shoulder or ledge formed on the sleeve component and providing a series of flat, radial steps and intervening camming inclines.

Figure 2:
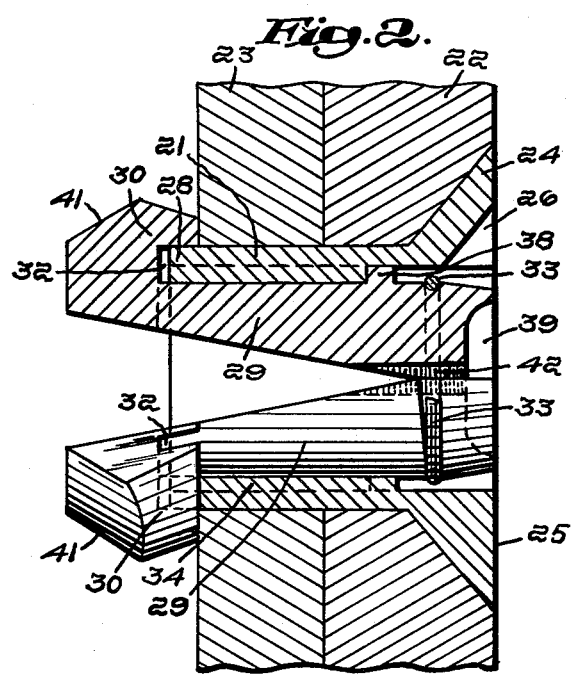
Figure 5:
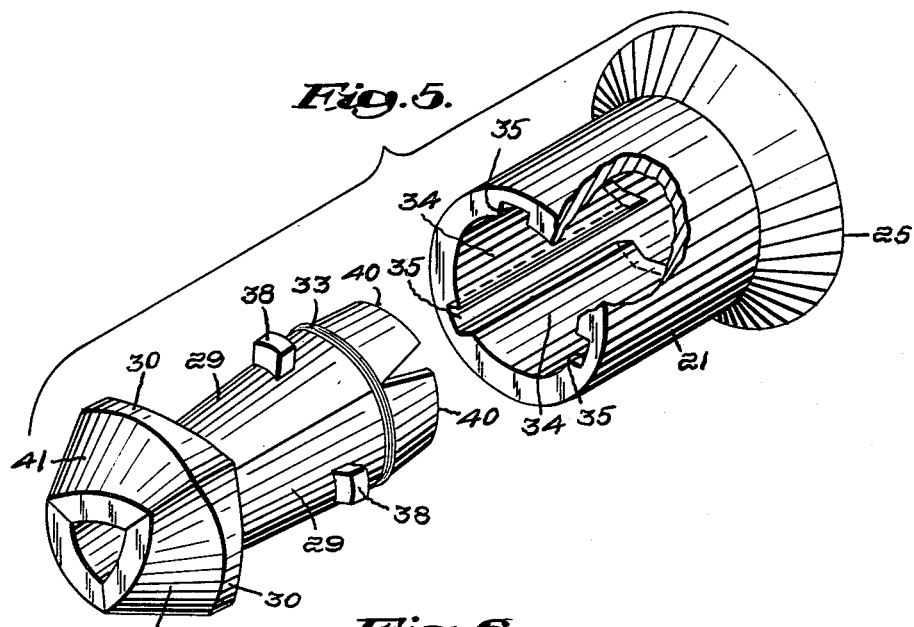
Figure 6:
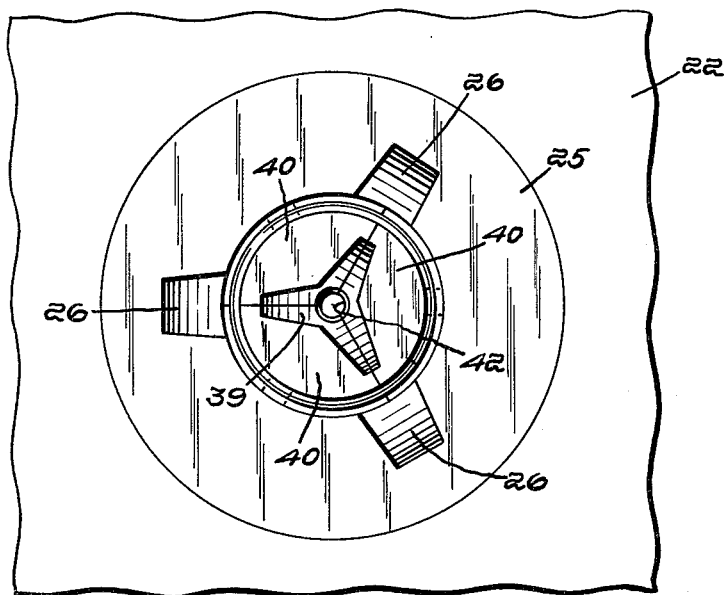

In the drawings:
FIG. 1 is a diametrical section, with one nut segment in elevation, showing the fastener of the first embodiment above mentioned, inserted in the concentric openings of a pair of juxtaposed panels, in position to be tightened; the sleeve component having a flush type head portion;

FIG. 2 is a view similar to FIG. 1 showing the fastener locked in clamping position;
FIG. 3 is a developed, planar view of the interior surfaces of the sleeve component, showing the three step-ratchet shoulders or ledges separated by intervening longitudinal channels;
FIG. 4 is a perspective view of the flush-type sleeve, partly broken away;
FIG. 5 is an exploded perspective, showing the three segment nut component and the projecting lugs on two of the visible segments, and the sleeve component, again partly broken away;
FIG. 6 is an elevation looking to the left of FIG. 2, showing the head portion of the flush sleeve and the contracted outer end portions of the nut segments;
FIGS. 7 and 8 are sectional views similar to FIGS. 1 and 2, respectively, but showing a sleeve component having a protruding type head portion, as an optional form.

In the embodiment chosen for the purpose of illustration in FIGS. 1 to 6, the sleeve component 21 of the fastener fits within concentric openings of the juxaposed plates or panels 22 and 23, and has a flared head portion 24 received in a counterbored recess of plate 22, so that the surface of the sleeve rim 25 is substantially flush with the surface of said plate. The rim surface is provided with three radial sockets 26 adapted to receive complemental projections of a spanner wrench, or other tool (such as disclosed, for example, in our copending application Serial No. 44,224, filed July 20, 1960), so that the sleeve may be held stationary while the fastener is being tightened or loosened.

In the optional form shown in FIGS. 7 and 8, the sleeve component 21' extends through plates 22' and 23' and has a protruding head portion 27, preferably formed with a hexagonal or other non-circular periphery so that a wrench or other tool (also disclosed in the last-mentioned application) may be applied to the sleeve head 27 to hold the sleeve against rotation while the fastener is being locked or unlocked. Except for these differences in sleeve heads 24 and 27, the fastener of FIGS. 7 and 8 is the same as the fastener of FIGS. 1 to 6; and other head formations, suitably bearing on the outermost plate or panel, may obviously be employed.

In any variation of its head portion, the cylindrical sleeve serves to center the contained nut component, and provides a true interior surface as a bearing for the expanded nut segments, described below, so that the holes in the plates or panels need not be precision bored. Moreover, when the sleeve is fully inserted so that its head portion abuts the outermost plate, as shown in FIGS. 1 or 7, the inner end 28 of the sleeve preferably projects beyond the innermost plate for a purpose to be explained.

The expandable nut component of the fastener comprises three identical nut segments 29, each having a head portion 30, projecting outwardly in a radial direction from its body or shank portion and formed with a flat surface 31 adapted to bear flush against the blind surface of the innermost plate 23, when the fastener is clamped as in FIG. 2. Each segment head 30 has a groove or socket 32 shaped to receive an arcuate portion of the sleeve end 28, in the clamping position of the fastener, thereby increasing the shear strength of the fasteners and ensuring a right angle bearing between the sleeve, the nut head and the plate 23 to resist vibration strains.

The nut segments are retained in cooperative relation by a C-ring 33 fitting in exterior grooves of the respective segments in the region of the radial pivot plane, or rocker plane, of the expandable segments. The C-ring tends to hold the segment heads expanded, with the outer ends of the segments contracted to abutting relation, when the nut assembly is otherwise unstressed. The nut component is assembled in the sleeve 21 before the C-ring is applied, and the resilient ring serves as a stop member to hold the parts of the fastener in assembled relation, as hereinafter described.

In accordance with this invention, the bore of the sleeve component is provided, around the inner portion thereof, with a plurality of ledge bodies or bosses 34, preferably three in number as best shown in FIG. 3, said bosses being spaced by intervening longitudinal slots or channels 35. The upper or outer ends of each of said block-like bodies provides an annular shoulder composed of alternate flat or radial surfaces 36 and inclined or cam surfaces 37, forming a step-ratchet ledge in which the successive steps are disposed at increasing distances from the inner end 28 of the sleeve.

Each nut segment 29 has a cooperating lug 38 projecting outwardly in a radial direction and of a size and location to slide through a complemental sleeve channel 35 and upon rotation of the nut component, to rest upon the respective steps 36. The three lugs of the nut assembly are disposed in a common radial plane, as are the respective complemental steps 36 of the ratchet ledge. Hence, when the nut component of the assembled fastener is rotated relative to the sleeve component, the nut assembly is drawn into the sleeve outwardly of the fastener from the position of FIG. 1 to the clamping position of FIG. 2 by a torque turn of less than 120°, as the lugs 38 ride up the inclines 37 onto the successive steps 36, moving to the right as shown in FIG. 3.

The nut component may be thus turned and torqued to locking position by inserting a tool into a triple-armed torque recess 39 formed by complemental grooves in the outer ends 40 of the respective nut segments, as best shown in FIG. 6. The shape of the torque recess and recommended types of tools adapted to fit the recess are illustrated and described in our said application, Serial No. 44,224.

After the fastener is assembled by sliding the nut component into the sleeve and applying the C-ring 33 as aforesaid, the C-ring constitutes a shoulder engageable with the outermost incline 37 of each ratchet shoulder or ledge to retain the nut assembly within the sleeve, when the lugs 38 are disposed in the channels 35. The longitudinal spacing between the C-ring and the inner or bearing surfaces of the lugs is such that said surfaces are aligned with the respective innermost steps 36, when the fastener is in unlocked position (FIG. 1). However, when the lugs are disposed on the innermost or lowermost steps 36 they also act as stops preventing accidental displacement of the nut component from the sleeve.

The assembled fastener is preferably inserted through the openings in the panels while the components are in the position last mentioned. It will be observed that the heads 30 of the nut segments have beveled outer surfaces 41 so that the heads are automatically contracted when presented to and pressed into and through said openings, as indicated by broken lines in FIG. 1 and in the contracted position shown in FIG. 5. It will be understood that the nut assembly of FIG. 5 is diagrammatic, for the C-ring would not be applied until the segments have been inserted in the sleeve 21, and then the ring would tend to expand the nut heads to the position shown in full lines in FIG. 1.

When the nut heads 30 pass through the plate openings they thus spring outwardly under influence of the C-ring to the full line position of FIG. 1, and the fastener is ready to be tightened as previously explained. In order to remove the unlocked fastener, the outer portions of the nut segments are preferably provided with complemental screw-threaded grooves 42 which, when the outer segment ends are held contracted (FIGS. 1 and 6), form a threaded tube-like socket adapted to receive a threaded and tapered tool. Such a conical retracting tool is shown in our said applications, Serial No. 835,580 now Patent No. 3,096,678 and Serial No. 44,224. By threading the conical end of such a tool into said socket, the outer segment ends 40 are expanded, causing the inner, headed ends 30 to contract to the broken line position of FIG. 1, thus permitting the fastener to be withdrawn from the panel openings.

The illustrated embodiment of the improved fastener herein illustrated and described is particularly useful in installations where a panel or plate needs to be removed and replaced, to permit inspection or repair of mechanism enclosed by the panel; for fasteners made in accordance with this invention may be quickly and easily applied and removed. Moreover, they may be produced at less expense than the screw-threaded bolts, such as shown in our said copending application Serial No. 835,580 now Patent No. 3,096,678, which are designed primarily for permanent installation in locations where excessive strain is expected.

It will be evident that the improved fasteners can be made in any desired length or size; and is applicable for installations subject to low shearing stresses.

It will be observed that, in the illustrated embodiment, the sleeve and nut components constitute a unitary assembly, inasmuch as the nut component is permanently retained within the sleeve component by the C-ring which provides a stop member limiting relative longitudinal movement of the respective components in one direction, while the protruding head portions of the nut segments limit such movement in the opposite direction.

It will also be apparent that, in the operation of the illustrated embodiment, the mutually engaging lug and ratchet elements are movable circumferentially in either direction relative to each other, with sliding and camming engagement over the step-ratchet surfaces under torquing action, to tighten or to release the fastener with a relatively short and rapid turn of a torquing tool.

We claim:

A fastener for clamping together structural panels having concentric openings therethrough, irrespective of the accessibility of the opening in the innermost panel, the fastener being insertable through said openings and comprising an expandable nut component having a plurality of similar and complemental segments movable angularly relative to each other in a radial direction with respect to the axis of the assembly, from inoperative to operative clamping position, and having a resilient member embracing the segments and holding them in assembled relation, each nut segment having a radially projecting head portion engageable with said innermost panel when the fastener is in clamping position; said resilient member engaging the inner ends of the nut segments and acting to urge the head portions of said segments toward expanded position; a sleeve component encircling the nut component and insertable in said panel openings, the sleeve having a head portion engaging the outermost panel when so inserted; cooperating means on the respective components for retaining the nut assembly within the sleeve and limiting relative longitudinal movement therebetween; and means for expanding the nut segments and tensioning them to clamping position, said means comprising shoulder members each having successive flat and inclined surfaces, and complemental lug members engageable respectively with said shoulder members, one of said respective members being rotatable relative to the other, and one of said respective members being carried by the nut segments, whereby the fastener may be clamped by rotation of the rotatable member through an arc less than 360°; the respective shoulder members being spaced relative to each other circumferentially of the fastener to provide intervening longitudinal channels, and the respective lug members being correspondingly spaced relative to each other and adapted to slide longitudinally in the respective channels; the respective lug members being carried by the respective nut segments and projecting radially outward therefrom, and the respective shoulder members being carried by said sleeve and projecting radially inwardly therefrom.

References Cited in the file of this patent

UNITED STATES PATENTS

| | | |
|---|---|---|
| 223,327 | Farrington | Jan. 6, 1880 |
| 594,526 | Glauber | Nov. 30, 1897 |
| 856,868 | Heffner | June 11, 1907 |
| 998,352 | Kublin | July 18, 1911 |
| 1,085,571 | Terney | Jan. 27, 1914 |
| 1,470,608 | Hine | Oct. 16, 1923 |
| 1,755,590 | Carr | Apr. 22, 1930 |
| 2,388,179 | Prowd | Oct. 30, 1945 |
| 3,096,678 | Devine et al. | July 9, 1963 |